(12) United States Patent
McNeil (10) Patent No.: US 7,018,691 B2
(45) Date of Patent: Mar. 28, 2006

(54) REINFORCING LINER, SYSTEM AND METHOD OF REINFORCING A STRUCTURE, AND REINFORCED STRUCTURE THEREBY

(75) Inventor: Ronald A. McNeil, Destin, FL (US)

(73) Assignee: Poly-Triplex Technologies, Denver, CO (US)

( * ) Notice: Subject to any disclaimer, the term of this patent is extended or adjusted under 35 U.S.C. 154(b) by 0 days.

(21) Appl. No.: 10/455,810

(22) Filed: Jun. 6, 2003

(65) Prior Publication Data

US 2004/0247810 A1    Dec. 9, 2004

(51) Int. Cl.
B29D 22/00 (2006.01)
B29D 23/00 (2006.01)
B32B 1/08 (2006.01)

(52) U.S. Cl. .............. 428/36.91; 405/184.2; 138/98

(58) Field of Classification Search ........... 428/36.9, 428/36.91; 405/303, 52, 154.1, 174, 184.2; 138/97, 98, 156, 167, 168, 169
See application file for complete search history.

(56) References Cited

U.S. PATENT DOCUMENTS

| | | | |
|---|---|---|---|
| 2,719,099 A | 9/1955 | Holbrook | |
| 5,265,981 A | 11/1993 | McNeil | |
| 5,306,449 A | 4/1994 | Brittain et al. | |
| 5,490,744 A | 2/1996 | McNeil | |
| 5,901,756 A | 5/1999 | Goodrich | |
| 5,915,886 A | 6/1999 | McNeil | |
| 6,019,136 A * | 2/2000 | Walsh et al. | 138/98 |
| 6,196,271 B1 * | 3/2001 | Braun et al. | 138/98 |
| 6,206,993 B1 * | 3/2001 | Kiest et al. | 156/156 |
| 6,368,025 B1 | 4/2002 | McNeil | |

FOREIGN PATENT DOCUMENTS

| | | |
|---|---|---|
| EP | 1415272 | 11/1975 |
| JP | 0553558 | 8/1993 |

* cited by examiner

*Primary Examiner*—Michael C. Miggins
(74) *Attorney, Agent, or Firm*—Berenato, White & Stavish, LLC (57) ABSTRACT

The present invention relates to a pipe liner assembly for sealing and rehabilitating the walls of an underground structure. The system includes an inflation bladder, a woven liner and a non-porous membrane. The woven liner has an inner surface adjacent the inflation bladder, an outer surface, and longitudinal edges. The liner also has a first fastener system adjacent the liner edges for releasably securing the liner edges so that the liner surrounds the bladder. The non-porous membrane is adjacent the outer surface of the liner. The membrane has longitudinal edges, and a second fastener system adjacent the membrane edges for releasably securing the membrane edges so that the membrane surrounds the liner. The present invention is also directed to an apparatus for curing a resin impregnated pipe liner, as well as methods of making and installing a reinforcing liner for an underground structure.

14 Claims, 8 Drawing Sheets

Fig. 8

# REINFORCING LINER, SYSTEM AND METHOD OF REINFORCING A STRUCTURE, AND REINFORCED STRUCTURE THEREBY

FIELD OF THE INVENTION

The present invention relates to a pipe liner assembly for sealing and rehabilitating the walls of an underground structure. The system includes an inflation bladder, a woven liner and a non-porous membrane. The woven liner has an inner surface adjacent the inflation bladder, an outer surface, and longitudinal edges. The liner also has a first fastener system adjacent the liner edges for releasably securing the liner edges so that the liner surrounds the bladder. The non-porous membrane is adjacent the outer surface of the liner. The membrane has longitudinal edges, and a second fastener system adjacent the membrane edges for releasably securing the membrane edges so that the membrane surrounds the liner. The present invention is also directed to an apparatus for curing a resin impregnated pipe liner, as well as methods of making and installing a reinforcing liner for an underground structure.

BACKGROUND OF THE INVENTION

Pipes, such as gas conduits, sewers, water mains and culverts, periodically require replacement or rehabilitation due to leakage caused by cracks or deterioration. Such pipes may be steel, corrugated sheet metal, cement, concrete, or brick. Replacement or rehabilitation of such pipes, particularly underground pipes, has heretofore been cumbersome, in part, because often the pipe must be unearthed for removal. Underwater pipes are also traditionally difficult to rehabilitate, given specialized equipment and workers must be employed. Rehabilitation of pipes running through protected wetland areas present additional difficulties, because leakage from damaged pipes, or leakage during a repair operation, may have deleterious environmental consequences.

A relatively short section of pipe, such as a few feet or less, having a relatively small diameter, such as 12 inches, may be easily replaced. However, often times a damaged pipe may not be easily reached for replacement. In addition, it may be difficult to remove a section of pipe, given the fluid in the pipe must be completely stopped from flowing during the entire replacement process. Furthermore, replacement techniques may not be viable for long sections of pipe or pipe having a relatively large diameter, such as 12 feet or more. Replacement may also be an impractical or overly expensive in some situations, such as replacing a culvert under a busy highway, wherein traffic would have to be stopped or rerouted for an unacceptable period of time.

Some methods have been developed which facilitate the replacement of underground pipe without the need to unearth the entire length of damaged pipe. Some methods involve digging trenches on opposite sides of a section of pipe to be replaced. A tensioned guide cable attached at one end is passed through the section of pipe being replaced. The cable is also attached to a winch. The pipe is fragmented, with the fragments pushed into the surrounding earth, and a new flexible pipe is pulled into place. This process is sometimes referred to as "pipe bursting." Pipe bursting eliminates the need to completely dig up the old pipe to replace it. However, it may not be viable or practical to dig trenches for the same reasons noted above.

Other methods provide for a soft liner that is fed into a pipe to be repaired, sometimes referred to as "soft lining." Generally, a tubular liner is constructed to have a soft and flexible character so that the liner can be moved into the pipe. By fluid pressure, the liner is urged against the pipe surface being lined. The liner shapes to the surface contour and bonds to the pipe surface.

Methods of rehabilitating manholes are disclosed in U.S. Pat. Nos. 6,368,025; 5,915,886; and 5,265,981, the disclosures of which are all incorporated herein by reference and the invention of which is the inventor hereof. A method and apparatus for inflating and curing such a resin impregnated manhole liner is disclosed in U.S. Pat. No. 5,490,744, the disclosure of which is incorporated herein by reference and is also the invention of which is the inventor hereof. In my referenced patents, the resin-impregnated outer fiberglass layer bonds to the manhole. However, such an installation is not feasible with underground pipes due to their length and the possibility of water.

Although the methods of rehabilitating sewers disclosed in the above referenced patents provide some advantages over prior methods, they do not disclose a practical method of reinforcing a pipe that is relatively long, such as 100 feet or more.

SUMMARY OF THE INVENTION

The present invention relates to a reinforcing liner for sealing and rehabilitating the walls of an underground structure. The liner comprises at least a first woven ply for being impregnated with a material for rigidifying the first ply, and first and second fasteners. The first fastener is adjacent a first longitudinal edge of the first ply. The second fastener is adjacent a second longitudinal edge of the first ply. The first and second fasteners are releasably securable, and form the first ply into a tubular member.

A pipe liner assembly for sealing and rehabilitating the walls of an underground structure is also provided. The liner assembly comprises an inflation bladder, a woven liner, and a non-porous membrane. The woven liner has an inner surface adjacent the bladder, an outer surface, and longitudinal edges. The woven liner also includes a first fastener system adjacent the liner edges for releasably securing the liner edges so that the liner surrounds the inflation bladder. The non-porous membrane is adjacent the outer surface of the liner. The membrane has longitudinal edges and a second fastener system adjacent the membrane edges for releasably securing the membrane edges so that the membrane surrounds the liner.

An apparatus for curing a resin impregnated pipe liner comprises a cylindrical body having a first end having an opening and a second end. A passage is longitudinally disposed therebetween. A rib extends radially from the cylindrical body for attaching a pipe liner to be cured thereto. A valve is operably associated with the opening. A conduit having a first end in flow communication with the opening and a second end extends from the second end. The conduit discharges air and steam from the liner during curing.

A rehabilitated structure comprises a longitudinally disposed passage. A woven, tubular liner rigidified with an impregnated material forms an inner tubular member within the passage. A non-porous membrane surrounds the inner tubular member, and is disposed adjacent the passage.

The present invention also provides for a method of making a reinforcing liner for an underground structure. A non-porous membrane is provided having a first longitudinal edge and a first fastener adjacent the first longitudinal edge, and a second longitudinal edge and a second fastener adjacent the second longitudinal edge. A woven liner is provided having a first longitudinal edge and a first fastener adjacent the first longitudinal edge, and a second longitudinal edge and a second fastener adjacent the second longitudinal edge. The liner is positioned onto the membrane. The liner is impregnated with a material that rigidities when cured. An inflation bladder is positioned onto the impregnated liner. The first and second fasteners of the impregnated liner are secured to form an impregnated tubular liner that surrounds the inflation bladder. The first and second fasteners of the membrane are secured to form a tubular membrane that surrounds the impregnated tubular liner.

A method of installing a pipe liner into an underground structure comprises the steps of: providing a sheeting material; positioning the sheeting material adjacent an opening of a structure to be rehabilitated; disposing a pipe liner on the sheeting material; and sliding the pipe liner across the sheeting material and into the structure.

DETAILED DESCRIPTION OF THE INVENTION

Figure 1:
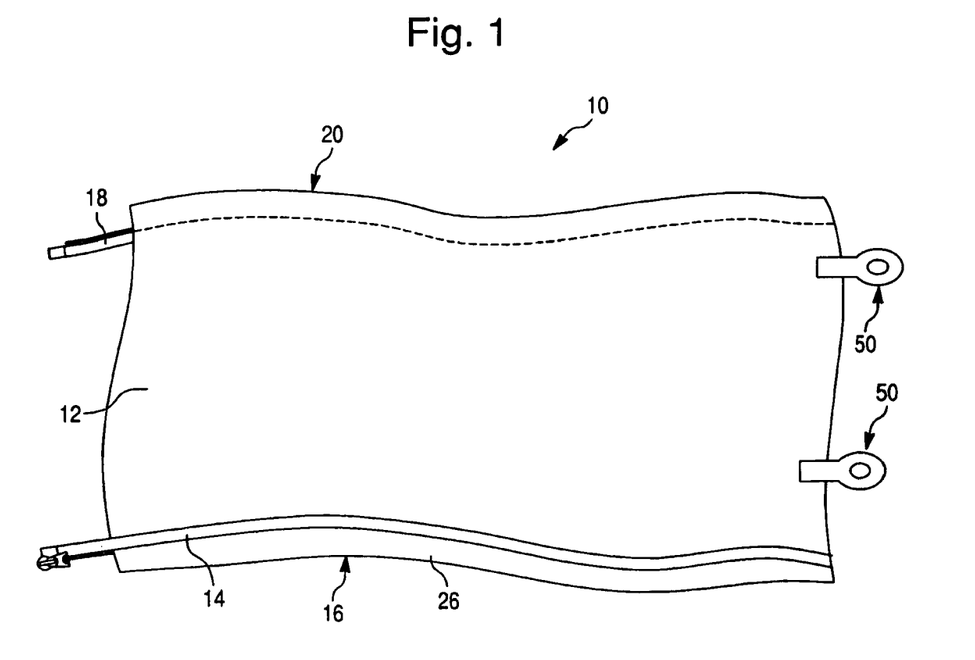
FIG. 1 is a plan view of a reinforcing liner according to the present invention.
Figure 2:
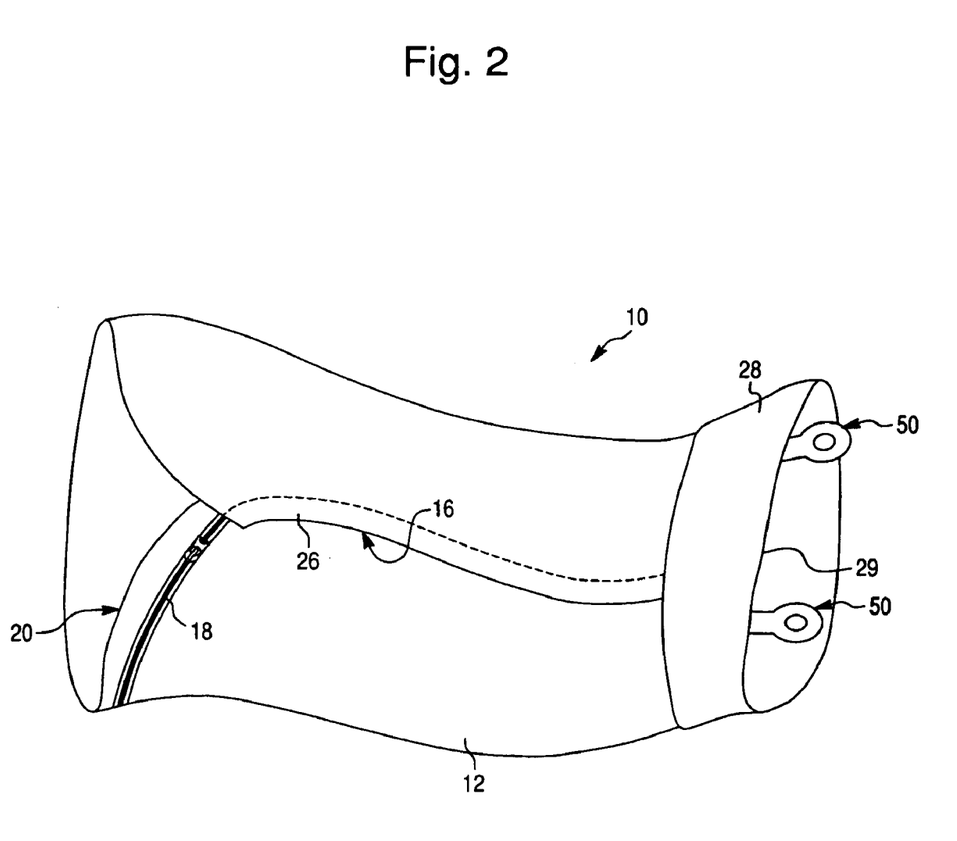
FIG. 2 is a perspective view of the reinforcing liner of FIG. 1 after the first and second fasteners have been releasably secured together.

As best shown in FIGS. 1 and 2, the present invention relates to a reinforcing liner 10 for sealing and rehabilitating the walls of an underground structure, such as a culvert, a sewer, a storm drain, an underground or underwater pipe, or the like. Liner 10 includes at least a first ply 12 for being impregnated with a material for rigidifying ply 12. A first fastener 14 is provided adjacent a first longitudinal edge 16 of first ply 12. A second fastener 18 is provided adjacent a second longitudinal edge 20 of first ply 12. First and second fasteners are releasably securable to form liner 10 into a tubular member, as best shown in FIG. 2. Preferably, first and second fasteners 14, 18 are a zipper. I have found that a brass zipper provides sufficient strength for releaseably securing longitudinal edges 16, 20 together. However, it should be understood that other fastening systems may be used, such as buttons, snaps, Velcro, rivets, and the like.

Figure 3:
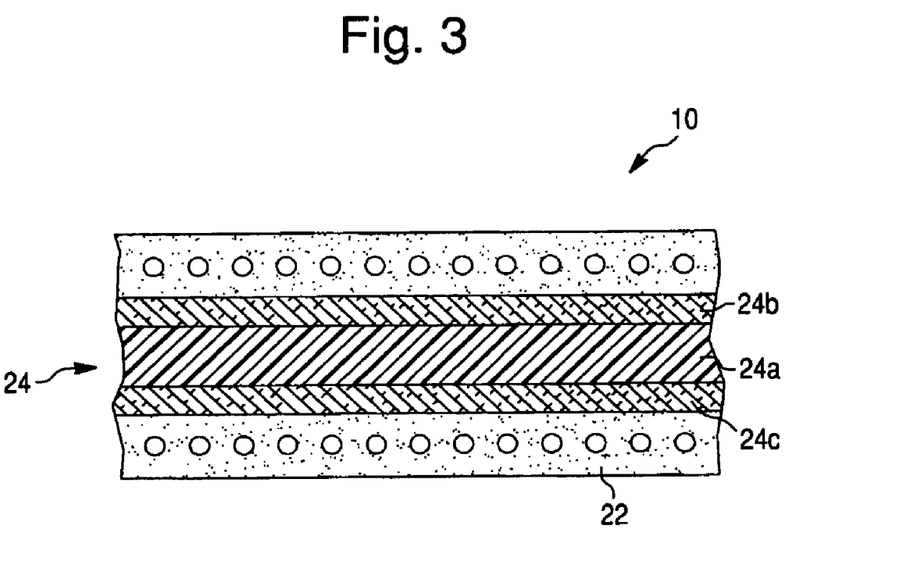
FIG. 3 is a cross-sectional view of a reinforcing liner according to a preferred embodiment of the present invention.

Preferably, liner 10 is multiple ply, such as described in U.S. Pat. Nos. 6,368,025 and 5,915,886, referenced above. As best shown in FIG. 3, liner 10 may include first ply 12 and a second ply 22. First and second plies 12, 22 preferably each comprise woven fiberglass. A non-porous layer 24 is disposed between and sandwiched by first and second plies 12, 22. In the preferred embodiment, non-porous layer 24 comprises an inner polyester fabric layer 24a coated with polyvinyl chloride. Thus, polyester fabric layer 24a is encased in a vinyl blanket. Non-porous layer 24 also includes outer fiber layers 24b, 24c. Preferably, fiber layers 24b, 24c are polyester felts, which are impregnated or impressed onto the outer surfaces of fabric layer 24a. The fiber layers 24b, 24c are permeable, but coated fabric layer 24a retains its impermeable quality. Non-porous layer 24 may have a thickness of 2.77 mm, and preferably has a thickness that is greater than that of first and second plies 12, 22.

Each of plies 12, 22 is impregnated with a material that rigidifies when cured. For example, the epoxy resin system described in the '886 patent may be used. Plies 12, 22 are impregnated with the resin prior to installation of liner 10 into a pipe. As used herein, the terms "pipe" and "structure" refer to any underground or underwater structure being rehabilitated, such as a culvert, a sewer, a drain, or some other conduit. Furthermore, the structure being reinforced may be formed from corrugated steel, concrete, brick, cement, metal, or other such materials used in the art. The resin causes the fiberglass plies 12, 22 to be rigidified after being cured, while being mechanically bonded to non-porous layer 24. After the resin is cured, the fibers of layers 24b, 24c of non-porous layer 24 become mechanically bonded with the resin-impregnated plies 12, 22, forming a strong bond therebetween. To increase the strength of the bond between plies 12, 22 and non-porous layer 24, the thickness of the felt of fiber layers 24b, 24c may be increased. While I prefer use of a two-component epoxy system for impregnating plies 12, 22, other thermal curable or non-thermal curable systems may be used.

Prior to securing first and second fasteners 14, 18 together, resin is easily applied to liner 10. Liner 10 may be laid out flat, so that an entire surface is exposed, as shown in FIG. 1. The resin may then be easily rolled onto the exposed surface using a roller or other applicator. First longitudinal edge 16 may then be folded toward second longitudinal edge 20, so that a portion of the opposing side of liner 10 is exposed. Resin may then be rolled onto exposed areas on the opposing side. First longitudinal edge 16 is folded back to the fully open position (as shown in FIG. 1), and the second longitudinal edge 20 may then be folded toward first longitudinal edge 16 to expose any portions of the opposing side that have not yet been covered with resin. In this way, resin may be easily applied to both sides of liner 10. Because the resin is thermally cured, there is sufficient time to permit liner 10 to be impregnated without premature hardening of the resin.

Conventional liners are typically sealed or stitched together to form a tubular liner prior to resin impregnation. The outer surface of the tubular liner is coated with resin. In order to cover the inner surface, the tubular liner is turned inside out, similar to "unsocking" a tube sock. Conventional liners may be suitable for some applications. However, the process of inverting a conventional liner in order to cover its inner surface with resin may be impractical or not viable if the liner is being installed in a pipe having a relatively large diameter or a relatively long length, given the enormous weight of the resin-impregnated liner. For example, a resin-impregnated liner for installation in a four-foot diameter pipe may weigh 30 pounds per foot, or more. Therefore, reinforcing a pipe having a diameter of 12 feet or more, and a length of 200 feet or more, is not practical using conventional methods. In addition, methods which pre-saturate the liner at a factory are also impractical given the saturated liner must then be transported to the jobsite in a refrigerated truck.

As best shown in FIG. 1, first fastener 14 preferably extends substantially parallel to first longitudinal edge 16, but is spaced from first longitudinal edge 16 by a defined distance, such as 2 inches or more. Likewise, second fastener 18 preferably extends substantially parallel to second longitudinal edge 20, and is also spaced from second longitudinal edge 20, such as 2 inches or more. In this way, a flap 26 is formed when first and second fasteners 14, 18 are secured together. Fasteners 14, 18 are thereby covered and sealed after curing the resin that impregnates flap 26. In addition, fasteners 14, 18 will not catch on the surface of the structure being reinforced during installation, or otherwise become damaged, since flap 26 completely covers first and second fasteners 14, 18 after they are secured together to form liner 10 into the tubular member, as shown in FIG. 2.

Liner 10 may also include a sleeve 28 extending adjacent a transverse edge 29 of the first ply 12, as best shown in FIG. 2. Sleeve 28 may be formed of a material impermeable to resin, and sleeve 28 is not covered with resin. Rather sleeve 28 aids in positioning and moving liner 10 during installation. In addition, sleeve 28 may be secured to an inflation device during installation of liner 10.

While liner 10 is shown as being substantially rectangular prior to securing together first and second fasteners 14, 18, and cylindrical after securing first and second fasteners 14, 18, it should be understood that liner 10 may have whatever shape is required for the structure being rehabilitated.

Figure 4:
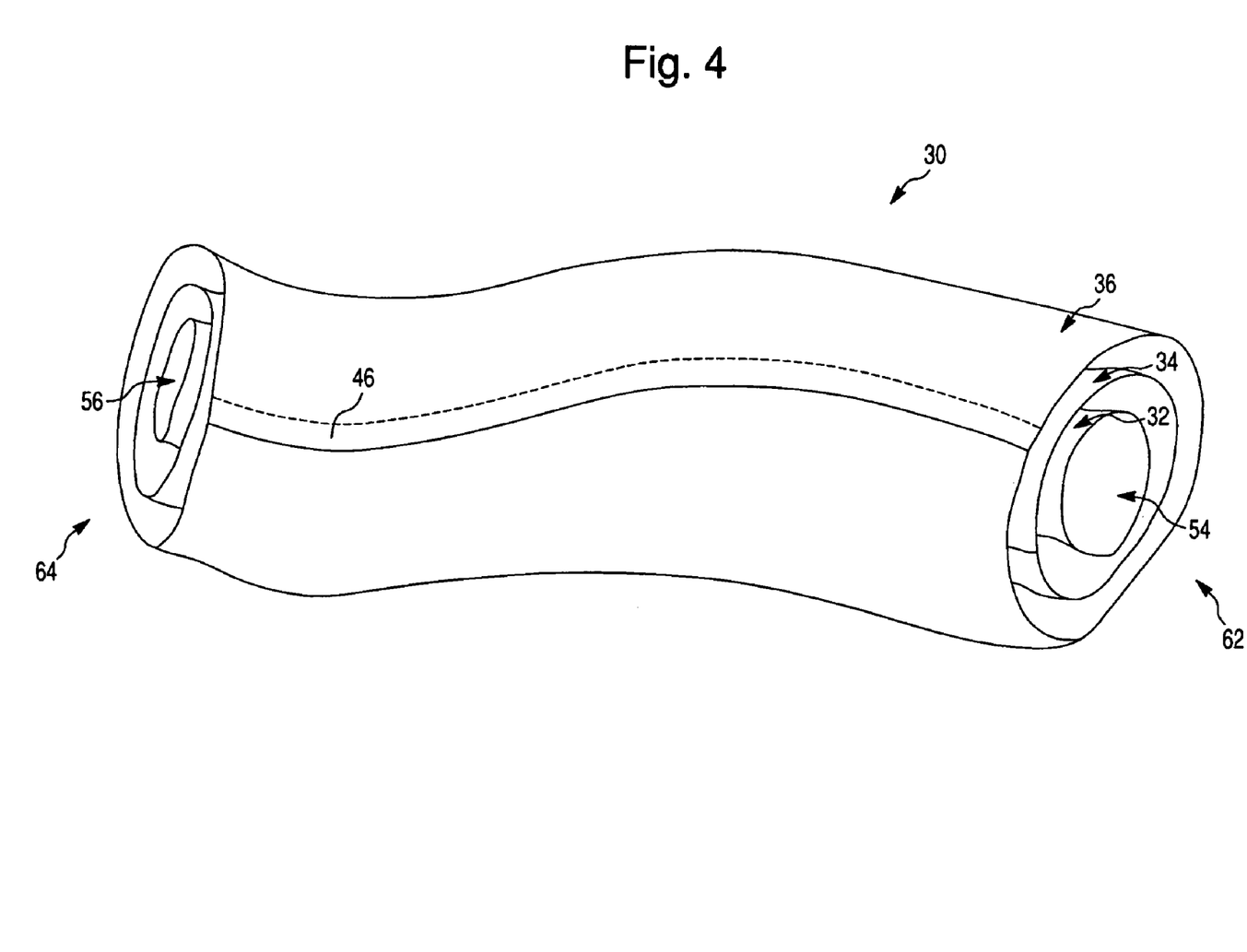
FIG. 4 is a perspective view of a liner assembly according to the present invention.

As best shown in FIG. 4, the present invention is also directed to a reinforcing liner assembly 30 for sealing and rehabilitating the walls of an underground structure. Liner assembly 30 comprises an inflation bladder 32, a woven liner 34, and a non-porous membrane 36.

In a preferred embodiment, woven liner 34 is liner 10, as described above and as shown in FIG. 5. As such, longitudinal edges 16, 20 are provided with first and second fasteners 14, 18, respectively, which form a first fastening system. Alternatively, woven liner 34 may be a tubular member that does not include first and second fasteners 14, 18.

Non-porous membrane 36 includes longitudinal edges 38, 40 having first and second fasteners 42, 44 adjacent edges 38, 40, respectively, forming a second fastener system. Preferably, the second fastener system is a zipper, more preferably a brass zipper. First fastener 42 is preferably parallel to and spaced from edge 38, and second fastener 44 is parallel to and spaced from edge 40, as described above for liner 10. Thus, a second flap 46 is formed when first and second fasteners 42, 44 are secured together forming non-porous membrane 36 into a tubular member, as best shown in FIG. 4. Non-porous membrane 36 preferably comprises reinforced polyvinyl chloride (PVC) fabric reinforced with nylon, and is impervious to chemicals, gas and liquid. Membrane 36 is preferably at least about 15 millimeters thick, more preferably at least about 20 millimeters thick.

Figure 5:
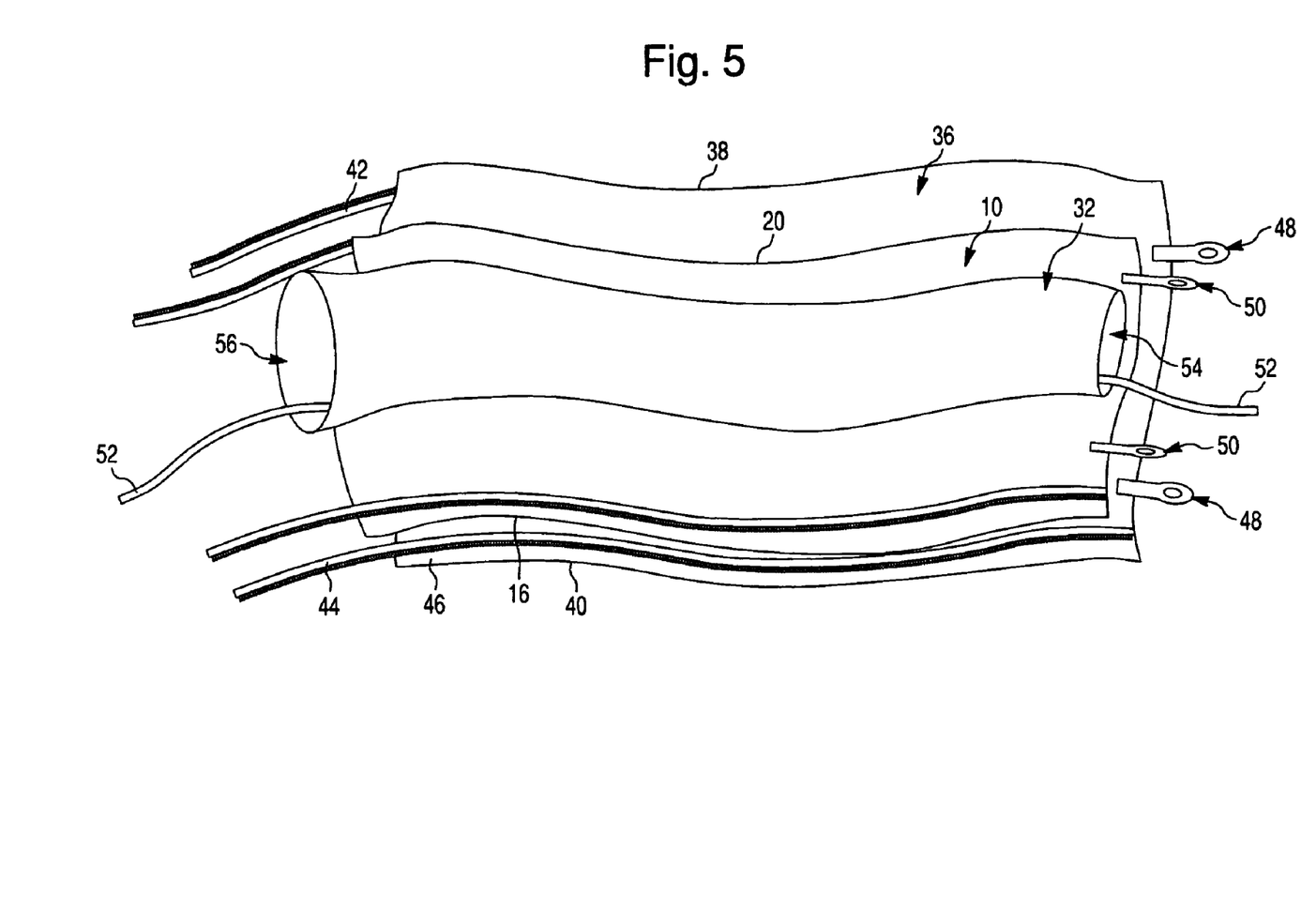
FIG. 5 is a perspective view of a liner assembly according to a preferred embodiment of the present invention.

Inflation bladder 32 is tubular, as best shown in FIG. 5. Preferably, inflation bladder 32 is formed from a vinyl material that is impervious to chemicals, gas and liquid. Bladder 32 prevents damage to liner assembly 30 during installation, and also permits inflation of liner assembly 30 after it is positioned as desired within the structure being rehabilitated.

A method of making reinforcing liner assembly 30 for an underground structure will be explained hereafter with woven liner 34 being liner 10. However, it should be understood that woven liner 34 may be a conventional liner that does not include the first fastening system of liner 10.

As best shown in FIG. 5, non-porous membrane 36 is disposed substantially flat on a surface with first and second fasteners 42, 44 unsecured. If membrane 36 is rectangular (which may be a preferred shape if the structure being rehabilitated has a cylindrical configuration), edges 38, 40 of membrane 36 are preferably substantially parallel when disposed on a surface. Membrane 36 preferably includes handles 48 for maneuvering and/or pulling membrane 36 into a desired position.

Liner 10 is then positioned onto membrane 36. Liner 10 may also include handles 50 for maneuvering and positioning liner 10 onto membrane 36. Liner 10 may also be maneuvered and positioned using sleeve 28. Liner 10 is then coated with resin, preferably an epoxy resin system as described above, so that first and second plies 12, 22 are impregnated with the resin. Respective edges 16, 20 of liner 10 and edges 38, 40 of membrane 36 may then be aligned.

Inflation bladder 32 is then positioned onto the resin-impregnated liner 10. Inflation bladder preferably includes nylon straps 52 secured within bladder 32, and extending from opposing openings 54, 56 of bladder 32. Nylon straps 52 are preferably heat sealed to bladder 32.

After bladder 32 is positioned on liner 10 as desired, first and second fasteners 14, 18, forming the first fastening system of liner 10, are secured together to form a resin-impregnated tubular liner that surrounds inflation bladder 32. If the first fastening system is a zipper, longitudinal edges 16, 20 are folded around bladder 32, and the zipper is simply "zipped up." Then, first and second fasteners 42, 44 of membrane 36 are secured together to form a tubular membrane that surrounds the resin-impregnated tubular liner (i.e. fastened liner 10). Therefore, as best shown in FIG. 4, bladder 32 is surrounded by liner 34 (i.e. liner 10), which is surrounded by membrane 36. As noted above, the zippers or first and second fastening systems are covered by flap 26 on liner 10, and second flap 46 on membrane 36, respectively.

Figure 6:
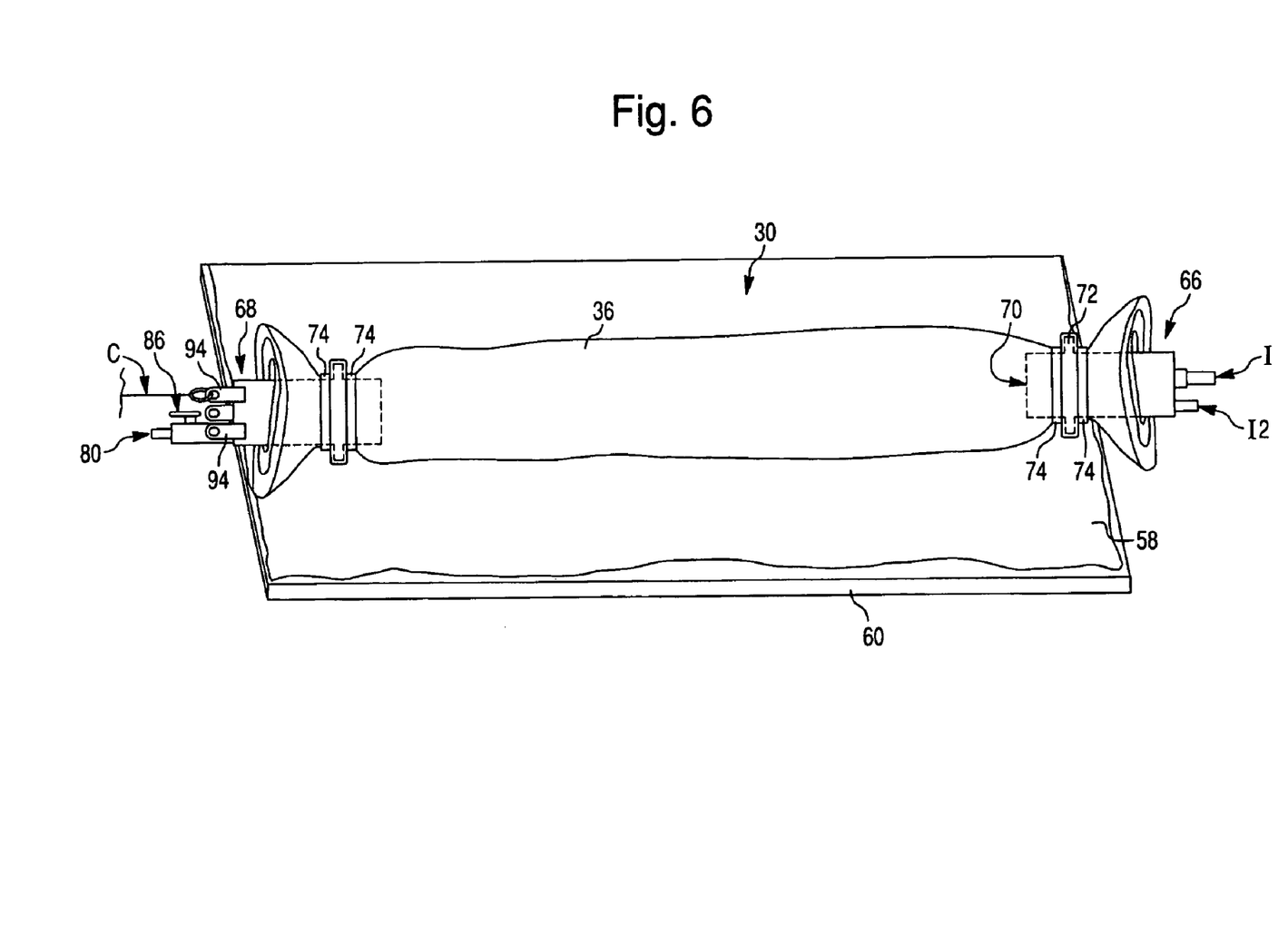
FIG. 6 is a perspective view of a liner assembly secured to upstream and downstream canisters and positioned on a sheeting material according to the present invention.

Preferably, liner assembly 30 is assembled proximate the structure being reinforced or rehabilitated. In a preferred method of installing liner assembly 30 into the structure, a sheeting material 58 is first placed on the surface proximate the structure, as best shown in FIG. 6. The sheeting material may be plastic sheeting having a thickness of 2 millimeters or more, depending on the size and weight of liner assembly 30, as well as the ground surface. More preferably, plywood 60 is laid out on the ground, and sheeting material 58 attached to the exposed upper side of plywood 60. Liner assembly 30 is then assembled thereon, so that membrane 36 is adjacent sheeting material 58, and assembly 30 may be easily slid across sheeting material 58 and into the opening of the structure being reinforced. In addition, a slippery substance that decreases frictional forces when pulling liner assembly 30 into the structure, such as silicone, may be applied on the inner surface of the structure being rehabilitated.

Prior to installing liner assembly 30 into the structure being rehabilitated, openings on opposing ends 62, 64 of liner assembly 30 are secured to upstream and downstream canisters 66, 68, respectively. Opening 54 of bladder 32 is fitted around output 70 of upstream canister 66. Opening 54 of bladder 32 is fitted onto upstream canister 66 so that a portion of bladder 32 extends around and beyond a securing rib 72. Likewise, a corresponding portion of liner 10 and membrane 36, which surround bladder 32, also extend onto and beyond securing rib 72. Bladder 32, liner 10 and membrane 36 are then strapped onto upstream canister 66, preferably using nylon web ratchet straps 74 positioned just above and below securing rib 72.

Figure 7:
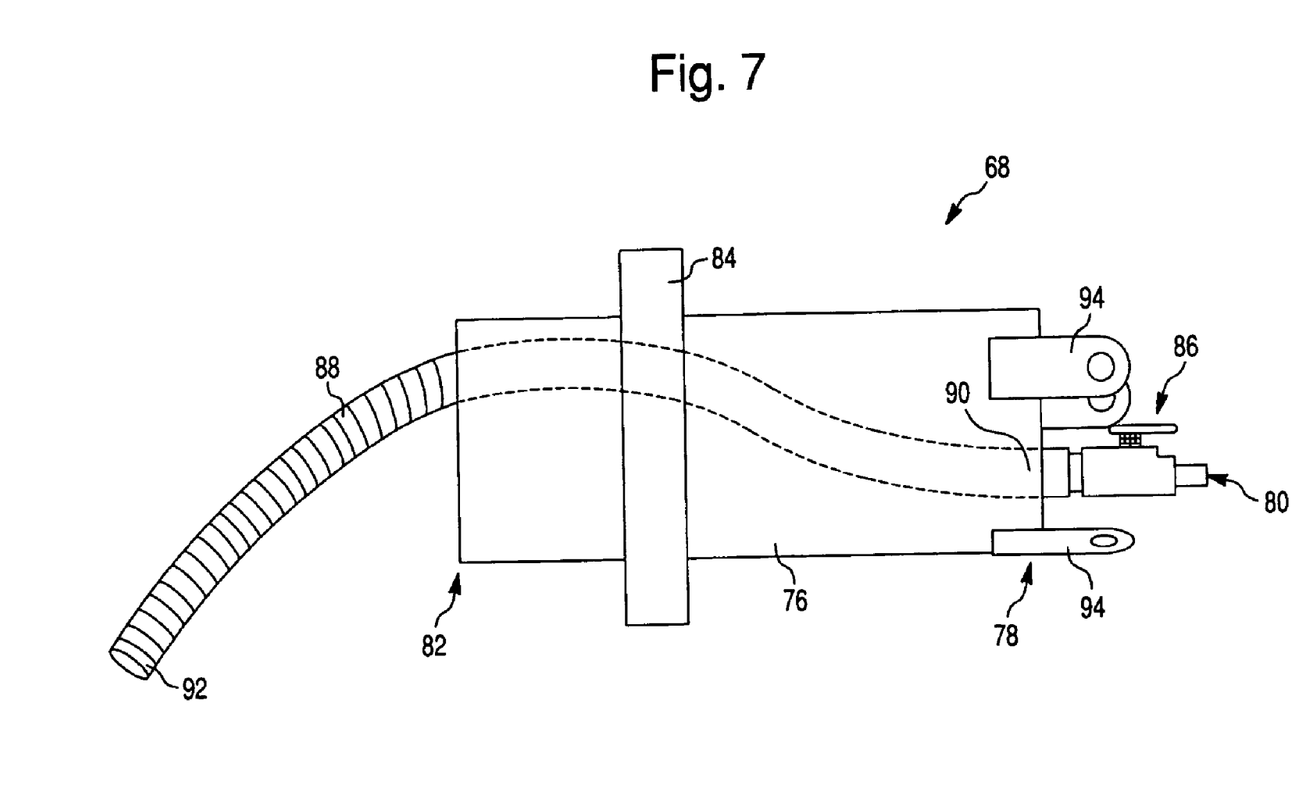
FIG. 7 is an elevational view with internal portions shown in phantom of a downstream canister according to a preferred embodiment of the present invention.

In the same way, the opposing end 64 of liner assembly 30 is secured to downstream canister 68. A preferred configuration of downstream canister 68 is best shown in FIG. 7. Downstream canister 68 includes a cylindrical body 76 having a first end 78 having an opening 80, and a second end 82. A longitudinally disposed passage extends between first and second ends 78, 82. A securing rib 84 extends radially from cylindrical body 76, around which liner assembly 30 is attached, preferably using ratchet straps 74 as described above for upstream canister 66. Preferably, rib 84 is at least about 1 inch wide and extends radially at least about 1 inch from cylindrical body 76. A valve 86 is operably associated with opening 80. A conduit 88 is provided having a first end 90 in flow communication with opening 80. A second end 92 of conduit 88 extends from second end 82. Preferably, conduit 88 is a flexible, reinforced hose. Downstream canister 68 also preferably includes brackets 94 secured to cylindrical body 76 and extending from first end 78.

After liner assembly 30 is assembled, secured to upstream and downstream canisters 66, 68, as shown in FIG. 6, and positioned adjacent a structure to be rehabilitated, the liner assembly 30 is pulled into the structure to a desired position. Preferably, a cable C is secured to at least one bracket 94 of downstream canister 68 via a hook or ring. The entire liner assembly 30 (including canisters 66, 68) may then be pulled through the structure being rehabilitated, for example a culvert. A winch or even a crane may be required to pull liner assembly 30 into the desired position within the structure, particularly if a long length of pipe is being rehabilitated. Bladder 32 and resin-impregnated liner 10 are completely sealed from the environment by membrane 36. Thus, membrane 36 fully encloses liner 10 in a "cocoon" protecting it from the elements, such as water, mud, rough surfaces, etc. that may be present in the pipe. Further, both open ends 62, 64 of liner assembly 30 are sealed from the environment by canisters 66, 68. It should be noted that valve 86 is closed on downstream canister 68. However, liner assembly 30 is not yet inflated while being pulled into position within the structure. Thus, any flow of fluids are not blocked while liner assembly 30 is being pulled into place, which minimizes the time the pipe being reinforced is nonfunctioning.

Once liner assembly 30 is in position, air is admitted into inflation bladder via upstream canister 66. Preferably, a positive displacement pump is used to supply the pressurized air, with the result that the air is heated while being pressurized. Heated air is supplied to an inlet I on upstream canister 66 and flows through a flow channel in canister 66 and out output 70 and into inflation bladder 32. Preferably, a positive displacement pump is used to inflate bladder 32, with a preferred heated air temperature of at least about 70° F. While inflation bladder 32 is being inflated, valve 86 on downstream canister 68 is closed so that no air can pass out first end 80.

After bladder 32 is inflated and liner assembly 30 thereby conforming to the walls of the pipe being reinforced, steam is blown into bladder 32. Steam is supplied to another inlet 12 on upstream canister 66. The steam flows through the flow channel in canister 66 and out output 70 and into inflation bladder 32. Valve 86 on downstream canister 68 is adjusted so that a pressure of between about 100 lbs/ft$^2$ to about 1500 lbs/ft$^2$ is maintained in the inflated bladder 32, preferably at least about 350 lbs/ft$^2$. The temperature within inflation bladder 32 is preferably at least about 300° F.

Due to the inflated bladder 32, liner 10 and membrane 36 are forced against the interior surface of the structure to be reinforced. Membrane 36 does not bond to the surface being reinforced. Rather, membrane 36 causes the resin within liner 10 to be equally distributed throughout the liner 10. Resin use is maximized, because none of the resin seeps into the surrounding environment. In addition, the surrounding environment is not contaminated by resin from liner 10. Steam is discharged from output 70 and into bladder 32 for a period sufficient to cure the resin, thereby rigidifying tubular liner 10 to form a rigid liner. I have found that the resin heats progressively, from upstream canister 66 to downstream canister 68, due to the surrounding structure acting as a heat sink. Thus, the resin adjacent canister 66 cures before the resin proximate canister 68. Condensate is created as the steam releases its latent heat and converts to water. The condensate likewise becomes heated over time.

As pressure, steam and condensate drain toward downstream canister 68, the pressure within inflation bladder 32 (as controlled by valve 86) causes conduit 88 to act as a discharge. This allows collected condensate to be discharged through opening 80, and thereby removed from bladder 32. When the curing process is complete, canisters 66, 68 are removed from liner assembly 30. If hot condensate were not discharged, the workers disconnecting canisters 66, 68 would be placed in substantial danger from the hot condensate. The present invention minimizes this problem, because the condensate is removed prior to disconnection.

In addition, the curing process is expedited by removing condensate during the curing process. The condensate that collects early on in the curing process is relatively cool given the pipe or structure being reinforced is typically cool when steam is first injected. Thus, removal of this cooler condensate speeds up the curing process, which saves time and money on the jobsite.

In some applications, it may be desirably to allow a portion of hot water to be maintained in bladder 32 to maintain a desired weight of liner assembly 30 during installation. For example, if liner assembly 30 is being installed in an underwater pipe, hot water may be used to weigh bladder 32 down, so that assembly 30 does not float or create undue stress on the pipe being reinforced.

Once the resin in liner 10 has been cured, canisters 66, 68 are disconnected. Then, inflation bladder 32 is separated and removed from liner assembly 30. By pulling on nylon straps 52, bladder 32 may be peeled away from liner 10 and easily removed from the passage of the reinforced structure.

The disclosed process provides that the resin be protected from coming in contact with the environment through this "cocoon" process (i.e. membrane 36). Liner 10 may be easily saturated with resin at the jobsite and pulled thorough a pipe, whether storm drain or sewer, and be cured in place.

Figure 8:
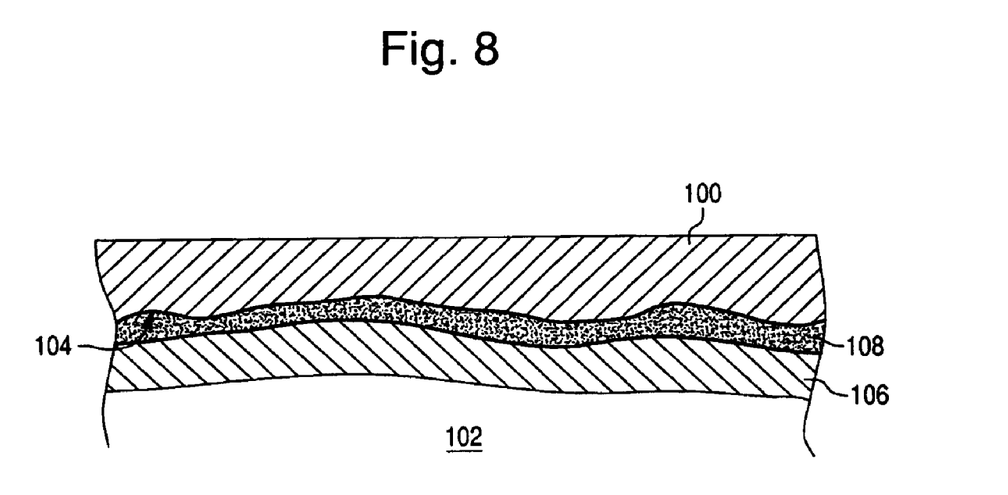
FIG. 8 is a fragmentary cross-sectional view of a rehabilitated structure according to the present invention.

As best shown in FIG. 8, a rehabilitated structure 100, such as a culvert, a pipe, a sewer, or some other channel, includes a longitudinally disposed passage 102 having a passage wall 104. The rigidified, tubular liner 10 forms an inner tubular member 106. The tubular non-porous membrane 36 forms an outer tubular member 108 that surrounds inner tubular member 106, and is disposed adjacent passage wall 104.

It will be apparent to one of ordinary skill in the art that various modifications and variations can be made in construction or configuration of the present invention without departing from the scope or spirit of the invention. Therefore, it is intended that the present invention cover all such modifications and variations, provided they come within the scope of the following claims and their equivalents.

I claim as follows:

1. A pipe sealing an rehabilitation assembly for sealing and rehabilitating the walls of underground pipes, comprising:
   an inflation bladder;
   a woven liner having an inner surface adjacent said bladder and an outer surface, said liner having longitudinal edges and a first fastener system adjacent said liner edges and extending substantially parallel to said liner edges, said first fastener system for releasably securing said liner edges together to form a substantially tubular structure surrounding said bladder; and
   a non-porous membrane adjacent said outer surface of said liner, said membrane having longitudinal edges and a second fastener system adjacent said membrane edges releasably securing said membrane edges so that said membrane surrounds said liner.

2. The assembly of claim 1, wherein said non-porous membrane is reinforced polyvinyl chloride fabric.

3. The assembly of claim 1, wherein said second fastener system extends parallel to said longitudinal edges of said membrane by a defined distance to form a first flap, said first flap covering said second fastener system when releasably secured to surround said liner.

4. The assembly of claim 1, further comprising a sleeve extending adjacent a transverse edge of said woven liner, said sleeve for securing to an inflation apparatus during installation of the pipe liner assembly in an underground structure.

5. The assembly of claim 1, wherein said first fastener system extends parallel to said longitudinal edges of said liner by a defined distance to form a second flap, said second flap covering said first fastener system when releasably secured to surround said bladder.

6. The assembly of claim 1, wherein said second fastener system is a zipper.

7. The assembly of claim 6, wherein said zipper is a brass zipper.

8. The assembly of claim 1, wherein said woven liner is impregnated with a material for rigidifying said woven ply when cured.

9. The assembly of claim 8, wherein said material comprises an epoxy resin system.

10. The assembly of claim 8, wherein said woven liner comprises at least a first woven ply and a non-porous layer adjacent said first woven ply.

11. The assembly of claim 10, further comprising a second woven ply, wherein said non-porous layer is disposed between said first and second woven plies.

12. The assembly of claim 11, wherein said first and second woven plies comprise woven fiberglass.

13. The assembly of claim 10, wherein said non-porous layer comprises a coated, polyester fabric.

14. The assembly of claim 13, wherein said non-porous layer further comprises first and second fiber layers adjacent opposing sides of said coated, polyester fabric.

* * * * *